United States Patent
Jung et al.

(10) Patent No.: US 9,338,353 B2
(45) Date of Patent: May 10, 2016

(54) METHOD OF AND SYSTEM FOR DETECTING MOTION IN REAL TIME

(71) Applicant: HANWHA TECHWIN CO., LTD., Changwon-Si (KR)

(72) Inventors: Gab-Cheon Jung, Changwon (KR); Jang-Hoon Song, Changwon (KR)

(73) Assignee: Hanwha Techwin Co., Ltd., Changwon-si (KR)

(*) Notice: Subject to any disclaimer, the term of this patent is extended or adjusted under 35 U.S.C. 154(b) by 231 days.

(21) Appl. No.: 13/945,020

(22) Filed: Jul. 18, 2013

(65) Prior Publication Data

US 2014/0118567 A1 May 1, 2014

(30) Foreign Application Priority Data

Nov. 1, 2012 (KR) .................. 10-2012-0123091

(51) Int. Cl.
G06K 9/00 (2006.01)
H04N 5/232 (2006.01)

(52) U.S. Cl.
CPC .................. *H04N 5/23251* (2013.01)

(58) Field of Classification Search
None
See application file for complete search history.

(56) References Cited

U.S. PATENT DOCUMENTS

| | | | | |
|---|---|---|---|---|
| 5,673,380 A | * | 9/1997 | Suzuki ................ | 345/473 |
| 6,401,194 B1 | * | 6/2002 | Nguyen et al. ........ | 712/210 |
| 7,028,271 B2 | * | 4/2006 | Matsugu ........... | G06K 9/00281 382/181 |
| 7,057,617 B1 | * | 6/2006 | Nishida ............ | G09G 5/227 345/472 |
| 7,684,486 B2 | * | 3/2010 | Ha ................... | G06T 3/4007 375/240.16 |
| 7,847,823 B2 | | 12/2010 | Habuka et al. | |
| 2001/0030702 A1 | * | 10/2001 | Zarnowski et al. ........... | 348/308 |
| 2004/0066384 A1 | * | 4/2004 | Ohba ................ | 345/419 |
| 2004/0175055 A1 | * | 9/2004 | Miller et al. ............ | 382/284 |
| 2008/0002963 A1 | * | 1/2008 | Chuang ........... | H04N 1/00307 396/310 |
| 2009/0097562 A1 | * | 4/2009 | Cho et al. ............. | 375/240.16 |
| 2010/0027664 A1 | * | 2/2010 | Sato ................ | 375/240.16 |
| 2010/0239184 A1 | * | 9/2010 | Furukawa ........... | G06T 3/4076 382/284 |
| 2012/0327189 A1 | * | 12/2012 | Muramatsu .......... | G01C 3/06 348/46 |
| 2013/0235272 A1 | * | 9/2013 | Kimiyama et al. ........... | 348/578 |
| 2014/0125844 A1 | * | 5/2014 | Sumitomo .......... | G06T 7/0042 348/231.99 |

FOREIGN PATENT DOCUMENTS

| | | |
|---|---|---|
| KR | 10-2001-0058516 A | 7/2001 |
| KR | 10-2002-0088609 A | 11/2002 |
| KR | 10-2005-0080862 A | 8/2005 |

OTHER PUBLICATIONS

JP 2008-216126; kawabe et al machine translation Mar. 6, 2007.*

* cited by examiner

*Primary Examiner* — Nancy Bitar
(74) *Attorney, Agent, or Firm* — Sughrue Mion, PLLC (57) ABSTRACT

A method and a system for detecting a motion in real time. The system includes: a parallel image generator which generates, in parallel, multi-resolution images, the generated multi-resolution images having at least one or more resolution levels; a characteristic dot extractor which extracts a characteristic dot from at least one of the generated multi-resolution images; and a motion vector detector which detects a motion vector from a low-resolution image based on the extracted characteristic dot and extends the detected motion vector of the low-resolution image to a motion vector of high-resolution.

16 Claims, 7 Drawing Sheets

| N/2(J=1) | N/4(J=2) | N/8(J=3) | N/16(J=4) | N/32(J=5) |
|---|---|---|---|---|
| 0 | dummy | | | |
| 1 | 0 | dummy | | |
| 2 | dummy | | | |
| 3 | 1 | 0 | dummy | |
| 4 | dummy | | | |
| 5 | 2 | dummy | | |
| 6 | dummy | | | |
| 7 | 3 | 1 | 0 | dummy |
| 8 | dummy | | | |
| 9 | 4 | dummy | | |
| 10 | dummy | | | |
| 11 | 5 | 2 | dummy | |
| 12 | dummy | | | |
| 13 | 6 | dummy | | |
| 14 | dummy | | | |
| 15 | 7 | 3 | 1 | 0 |
| 16 | 8 | | | dummy |
| 17 | dummy | | | |
| 18 | 9 | 4 | dummy | |
| 19 | dummy | | | |
| 20 | 10 | dummy | | |
| 21 | | | | |

FIG. 5A

| 1 | 0 | −1 |
|---|---|---|
| 1 | 0 | −1 |
| 1 | 0 | −1 |

COLUMN EDGE KERNEL

FIG. 5B

| 1 | 1 | 1 |
|---|---|---|
| 0 | 0 | 0 |
| −1 | −1 | −1 |

ROW EDGE KERNEL

METHOD OF AND SYSTEM FOR DETECTING MOTION IN REAL TIME

CROSS-REFERENCE TO RELATED PATENT APPLICATION

This application claims the benefit of Korean Patent Application No. 10-2012-0123091, filed on Nov. 1, 2012, in the Korean Intellectual Property Office, the disclosure of which is incorporated herein in its entirety by reference.

BACKGROUND OF THE INVENTION

1. Field of the Invention

Apparatuses and methods consistent with exemplary embodiments relate to detecting a motion in real time, and more particularly, to detecting a motion in real time, by which multi-resolution images are generated in parallel to extract a motion vector in order to reduce a computation time.

2. Description of the Related Art

In the related art, a block matching method is used to extract a motion vector from a moving picture. The block matching method divides an image into blocks having predetermined sizes and searches a previous image for a block which best matches a current block.

In the related art, apparatuses which correct sways of an image require a global motion vector. Therefore, as the block matching method is used for all blocks of the divided image, the amount of required computation increases excessively.

For example, a monitoring closed-circuit television (CCTV) camera, a digital camera, a digital camcorder, or the like have a high-resolution megapixel image and an extended frame rate of 30, 60, or 120 frames per second. The high-resolution megapixel image requires a large search area corresponding to the resolution of the image to calculate an appropriate motion vector. Computations for detecting the motion vector increase with an increase in the search area, and thus a large amount of time is required to process the computations through a central processing unit (CPU) or a digital signal processor (DSP). In other words, when the high-resolution megapixel image is processed by a calculator having a computation function, such as the CPU or the DSP, real-time processing is very difficult. Therefore, dedicated hardware is required to process the high-resolution megapixel image. In particular, for systems which process 60 frames or more per second of a high-resolution megapixel, dedicated hardware is necessary.

Accordingly, in the related art a method of extracting a motion vector by using a block matching method only for characteristic dots of an image has been used. Also, in the related art, a method of dividing an input image into multi-resolution images to reduce computations, detecting a motion vector from a low-resolution image having a small search area, and extending the low-resolution image to a high-resolution image have been suggested.

SUMMARY OF THE INVENTION

Exemplary embodiments provide a system and method for detecting a motion in real time, by which multi-resolution images for performing block matching are generated in parallel, and a motion vector of a low-resolution image extends to a high-resolution motion vector to detect a motion vector based on characteristic dots.

According to an aspect of an exemplary embodiment, there is provided a system for detecting a motion, comprising: a parallel image generator configured to generate, in parallel, multi-resolution images; a characteristic dot extractor configured to extract a characteristic dot from at least one of the multi-resolution images having at least one or more resolution levels; and a motion vector detector configured to detect a motion vector from a low-resolution image based on the characteristic dot, and further configured to extend the detected motion vector of the low-resolution image to a high-resolution motion vector based on a result of the detection.

The parallel image generator is further configured to obtain an original image having a $0^{th}$ resolution level from an input image memory to generate, in parallel, the multi-resolution images.

When the multi-resolution image generator generates images having resolution levels from a first resolution level to a $j^{th}$ level, the multi-resolution image of each resolution may have size of $(N \times N)/4^j$ of the original image.

The parallel image generator is further configured to store the multi-resolution images in a multi-resolution memory through a DMA controller.

The DMA controller is configured to sequentially arrange the multi-resolution images based on resolution levels of the generated multi-resolution images, and is further configured to store the arranged multi-resolution images in the multi-resolution memory.

The DMA controller is further configured to perform DMA transmission scheduling with respect to output results having at least a second level on an odd column of the first level to reduce a size of hardware.

The DMA controller may not be included according to each resolution level, but one DMA controller is further configured to store all of the multi-resolution images in the multi-resolution memory.

The DMA controller is further configured to embed and store the multi-resolution image having a higher than a second resolution level between columns storing an image having the second resolution level.

The parallel image generator is further configured to generate an image having a first level, and configured to simultaneously generate, in parallel, images having levels higher than a second level.

The characteristic dot detector is further configured to generate a characteristic dot pixel from an image of the multi-resolution image having an intermediate resolution level.

The characteristic dot detector is further configured to divide an image into a plurality of square areas which do not overlap with each other, and configured to generate characteristic pixels of the square areas.

The characteristic dot detector is further configured to extract corner dots of pixels of the square areas, and configured to use a pixel having the greatest corner dot as a characteristic dot of a sub area.

The characteristic dot detector is further configured to map the characteristic pixel of the image having the intermediate resolution level on an image having a lowest resolution level.

The motion vector detector is further configured to estimate a motion from a low-resolution image by using previous and current frame images, and further configured to extend the extracted motion to a high-resolution image to detect a motion.

The motion vector detector is further configured to use the motion vector extracted from the low-resolution image as an initial value when obtaining a motion vector from the high-resolution image.

The motion vector detector is further configured to set a motion estimation block based on one characteristic dot in a current frame image and a search area block, including the motion estimation block in a previous frame image, and configured to compare the motion estimation block with the search area block to detect a motion vector based on a result of the setting.

According to an aspect of another exemplary embodiment, there is provided a method of detecting a motion, including: generating, in parallel, multi-resolution images; extracting a characteristic dot from an image of the multi-resolution images having at least one or more resolution levels; and detecting a motion vector from a low-resolution image based on the characteristic dot and extending the motion vector of the low-resolution image to a high-resolution motion vector.

According to an aspect of another exemplary embodiment, there is provided a system for detecting a motion, comprising: a parallel image generator configured to generate, in parallel, multi-resolution images, the generated multi-resolution images having at least one or more resolution levels if lines for generating the images having the different resolution levels are valid; a characteristic dot extractor configured to extract a characteristic dot from an image of multi-resolution images; a motion vector detector configured to detect a motion vector from a low-resolution image based on the extracted characteristic dot, and further configured to extend the detected motion vector of the low-resolution image to a motion vector of a high-resolution image based on a result of the detection; a direct memory access (DMA) controller configured to store the multi-resolution images generated by the parallel image generator in a multi-resolution memory according to resolution levels; and a sway corrector configured to correct a sway of an image by using the motion vector of the high-resolution image.

According to an aspect of another exemplary embodiment, there is provided a method of detecting a motion vector, including: inputting an original image of a current frame; generating multi-resolution images in parallel and storing the multi-resolution images in a multi-resolution memory; extracting a characteristic dot from an image having an intermediate resolution level; mapping the characteristic dot on a low-resolution image and setting a search area block comprising a motion estimation block based on a characteristic dot of a current frame in a low-resolution image and a motion estimation block of a previous frame; performing block matching to detect a motion vector; and extending the motion vector of the low-resolution image to a high-resolution level motion vector.

BRIEF DESCRIPTION OF THE DRAWINGS

The above and/or other aspects will become more apparent by describing certain exemplary embodiments with reference to the accompanying drawings, in which.

DETAILED DESCRIPTION OF THE INVENTION

Certain exemplary embodiments will now be described in greater detail with reference to the accompanying drawings.

In the following description, like drawing reference numerals are used to denote like elements, even in different drawings. The matters defined in the description, such as detailed construction and elements, are provided to assist in a comprehensive understanding of the exemplary embodiments. However, exemplary embodiments can be practiced without those specifically defined matters. Also, well-known functions or constructions are not described in detail since they would obscure the exemplary embodiments with unnecessary detail.

According to an exemplary embodiment, hardware and a method for reducing a computation time to calculate an appropriate motion vector of a high-resolution megapixel image are provided. As a search area for detecting a motion vector from a high-resolution image becomes greater, the hardware required for detecting the motion vector becomes greater. Therefore, it is difficult to realize the required hardware in a small, low-power camera. If the search area is small, a size of the hardware may be smaller, but a resolution of an image is lowered.

In a method of detecting a multi-resolution motion vector according to an exemplary embodiment, a motion vector is first estimated in a low resolution image and the estimation result is gradually extended to a high-resolution image. Therefore, the motion vector is detected by using a small search area in each resolution image, and thus a computation time is reduced.

Figure 1A:
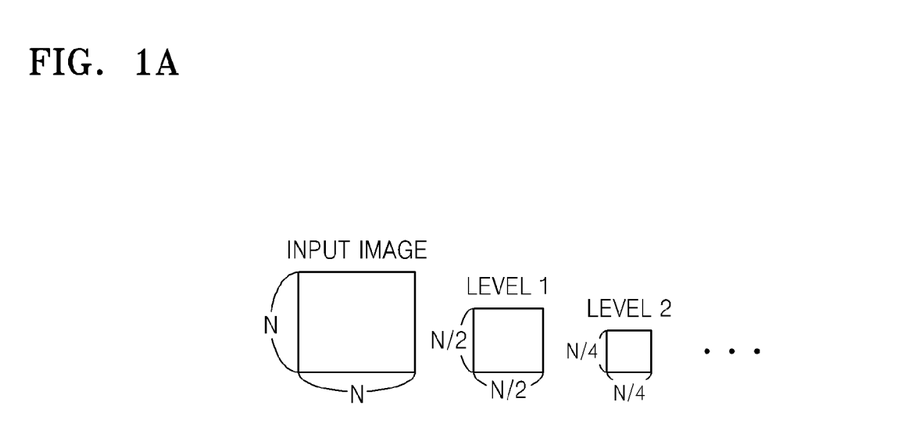
FIGS. 1A and 1B are schematic views illustrating a method of the related art of generating a multi-resolution image.
Figure 1B:
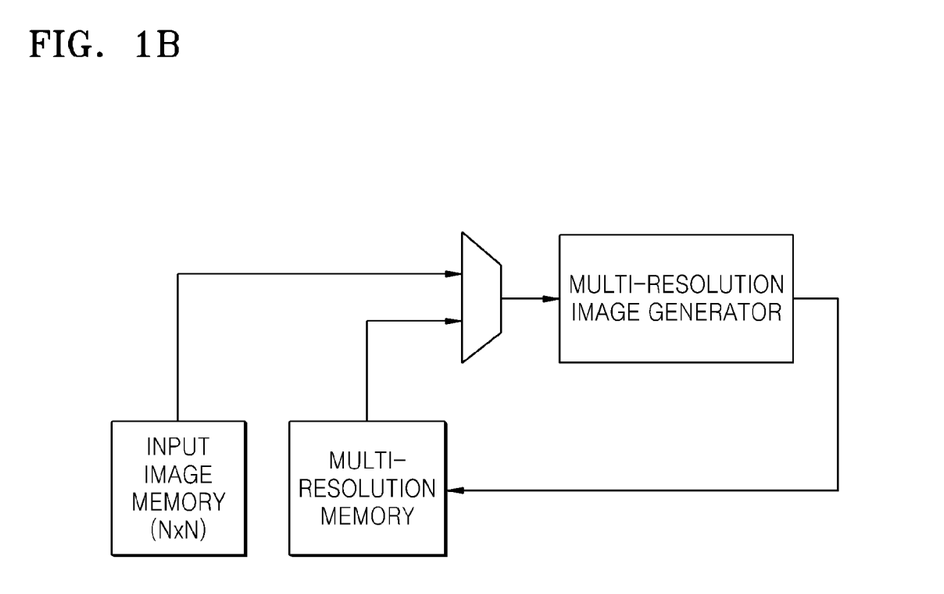

FIGS. 1A and 1B are schematic views illustrating a method of the related art of generating a multi-resolution image.

As shown in FIG. 1A, if an N×N image is input as an input image, the N×N image is set as an image having $0^{th}$ resolution level, and an N/2×N/2 image is generated and set as an image having a $1^{st}$ resolution level.

FIG. 1B illustrates a processor which re-generates an image having a next higher resolution level if a generated image is input. In other words, if an input image memory inputs the N×N image which is an original image having a $0^{th}$ resolution level, a multi-resolution image generator generates the N/2×N/2 image having the $1^{st}$ resolution level. The generated N/2×N/2 is transmitted to a multi-resolution memory, and the multi-resolution memory provides the N/2×N2 image to allow the multi-resolution image generator to generate an N/4×N/4 image having a $2^{nd}$ resolution level from the N/2× N/2 image. Through the above-described method, lower resolution images are sequentially generated to a final $L^{th}$ resolution level.

However, after all images of one level is generated, (N by N)+(N/2 by N/2)+(N/4 by N/4)+ . . . processing time is required to generate the image of next level for the N by N input image. In other words, as described above, because of all of processes of estimating a motion and correcting sways with a motion vector are performed after multi-resolution images are generated, real-time processing of an image is difficult in an image system for more than 60 frames per second.

Therefore, a method of generating multi-resolution level images not requiring a large amount of sequential processing time, but instead requiring a large amount of processing time in parallel, according to an exemplary embodiment, will now be described.

Figure 2:
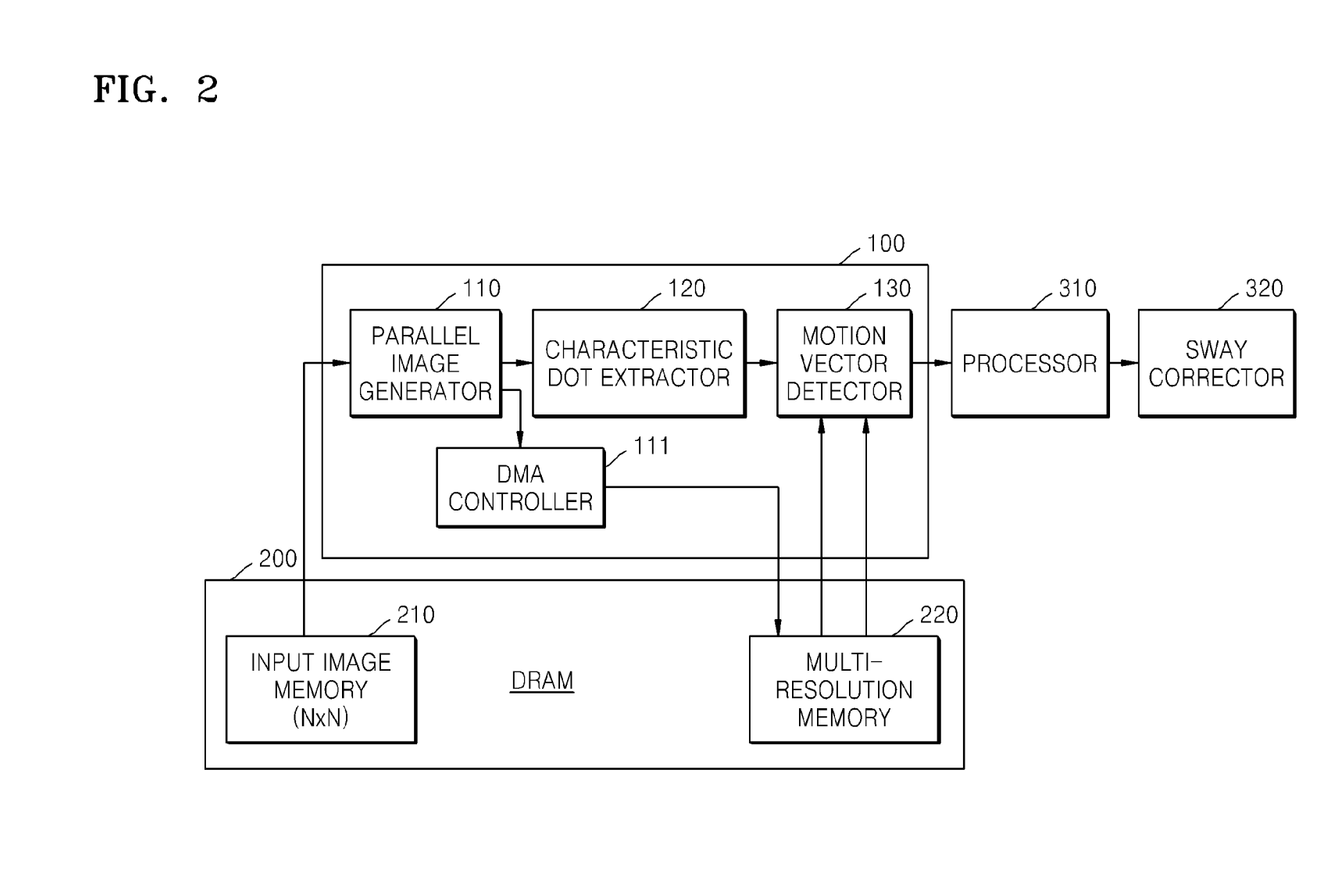
FIG. 2 is a block diagram illustrating a system for detecting a motion vector according to an exemplary embodiment.

FIG. 2 is a block diagram illustrating a system for detecting a motion vector according to an exemplary embodiment.

Referring to FIG. 2, a multi-resolution image generator includes a parallel image generator 110, a characteristic dot extractor 120, a motion vector detector 130, an input image memory 210, a multi-resolution memory 220, a DMA controller 111, a processor 310, and a sway corrector 320. The input image memory 210 and the multi-resolution memory 220 may be included in a dynamic random access memory (DRAM) 200.

As described above, according to an exemplary embodiment, a motion vector may be detected in a high-resolution image having a high frame rate per second through hardware having a low memory usage. Therefore, sways of an image may be corrected in real time. In the related art, an image having a resolution level is generated, and then an image having a next higher resolution level is generated. However, according to one or more exemplary embodiments, if lines of an image for generating an individual resolution image are valid, an image having a next higher resolution level is generated in parallel to reduce a processing time.

The input image memory 210 and the multi-resolution memory 200 are included in the DRAM 200. The input image memory 210 stores an original N×N image and provides the original N×N image to the parallel image generator 110.

The multi-resolution memory 220 stores a multi-resolution image generated by the parallel image generator 110 and provides the multi-resolution image to the motion vector detector 130.

The parallel image generator 110 obtains an original image from the input image memory 210 to generate the multi-resolution image in parallel and stores the multi-resolution image in the multi-resolution memory 220. According to an exemplary embodiment, a multi-resolution image is generated in parallel. Therefore, in contrast to the related art as described with reference to FIGS. 1A and 1B, a generated low resolution level image does not need to be received from the multi-resolution image 220 to generate an image having a higher resolution level.

In the related art, an image having a resolution level is generated, and then an image having a next higher resolution level is generated. However, according to one or more exemplary embodiments, if the lines of an image from generating an individual resolution image are valid, an image having a next higher resolution level may be simultaneously generated in parallel to reduce a processing time.

The parallel image generator 110 generates reduced images to a $J^{th}$ resolution level for the original N×N image (having the $0^{th}$ resolution level). A generated multi-resolution image having each of the J resolution levels has size of $(N \times N)/4^J$ of the original N×N image, and a pixel value of the reduced image having the $J^{th}$ resolution level is obtained through an average of 4 adjacent pixels on a $J-1^{th}$ resolution level as Equation 1 below;

$$Y_L(i, j) = \frac{1}{4}\sum_{n=0}^{1}\sum_{m=0}^{1} Y_{L-1}(2i+n, 2j+m) \quad (2)$$

$$(L = 1, 2, \ldots J)$$

wherein i and j denote positions of individual pixels, and L denotes a resolution level.

More specifically, if processing lines for generating an image having each resolution level are valid, the parallel image generator 110 may generate an image having higher resolution level to generate a multi-resolution image for the N×N image for about $N^2$ cycles.

A DMA controller 111 stores multi-resolution images generated by the parallel image generator 110 in the multi-resolution memory 220.

A DMA is used to store consecutive image pixel data in or read the consecutive image pixel data from the DRAM 200. If the DMA is used, data may be moved without executing a program through a CPU. Therefore, speeds of an input and an output may be improved. Unless multi-level images generated in parallel are sequentially arranged according to resolution levels and then stored in a memory, it is difficult for the motion vector detector 130, which is to read an image block of each resolution by using block matching, to read a block of an image according to each resolution level.

Therefore, a method of using DMA controllers 111 according to resolution levels may be used. However, the number of DMA controllers 111 increases with an increase in the number of resolution levels. Therefore, hardware requirements become larger. Accordingly, in an exemplary embodiment, when an image having the $J^{th}$ resolution level is generated, a computation is not performed at resolution level 1 on an odd line as in Equation 1 above, and is performed at resolution level 2 on an odd line. Therefore, DMA transmission scheduling may be performed by using one DMA controller 111 to store images in the multi-resolution memory 220 according to resolutions.

Figure 3:
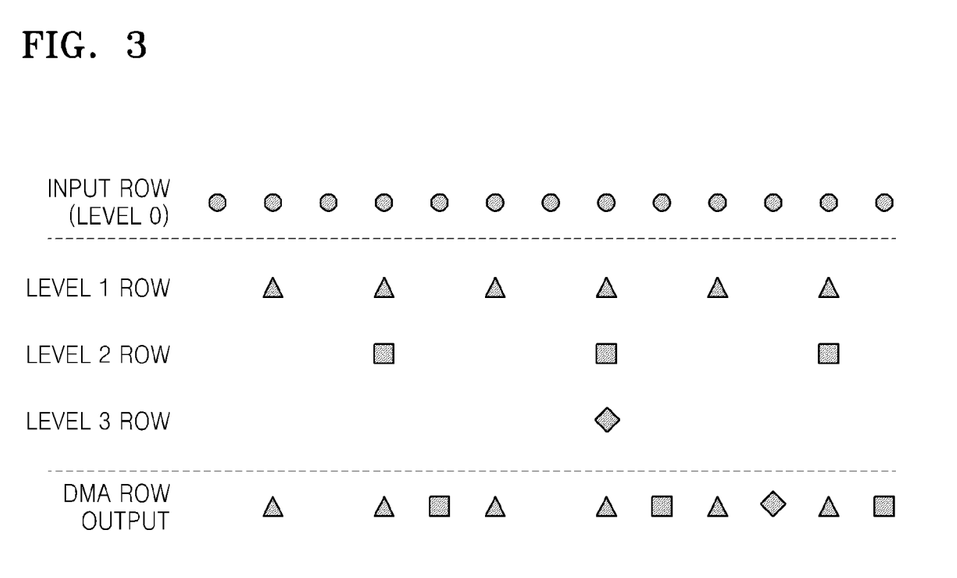
FIG. 3 is a view conceptually illustrating computation orders of a parallel image generator and transmission orders of a DMA controller for generating reduced images having resolution levels according to an exemplary embodiment.

FIG. 3 is a view conceptually illustrating the computation order of parallel image generator 110 and the transmission order of DMA controller 111 for generating reduced images according to an exemplary embodiment. The transmission order of DMA controller 111 is row transmission order corresponding to image of each level. Here, ○, ∆, □, or ◇ denote one row corresponding to an image of each resolution level output from the parallel image generator 110.

As shown in FIG. 3, parallel image generator 110 can generate multi-resolution image in $N^2$ cycles by generating directly row of J resolution level, if two row (previous row and present input row) of J−1 resolution level is available (which means the two rows of previous level is generated, for example, □ is generated if two ∆ is generated).

Figure 4:
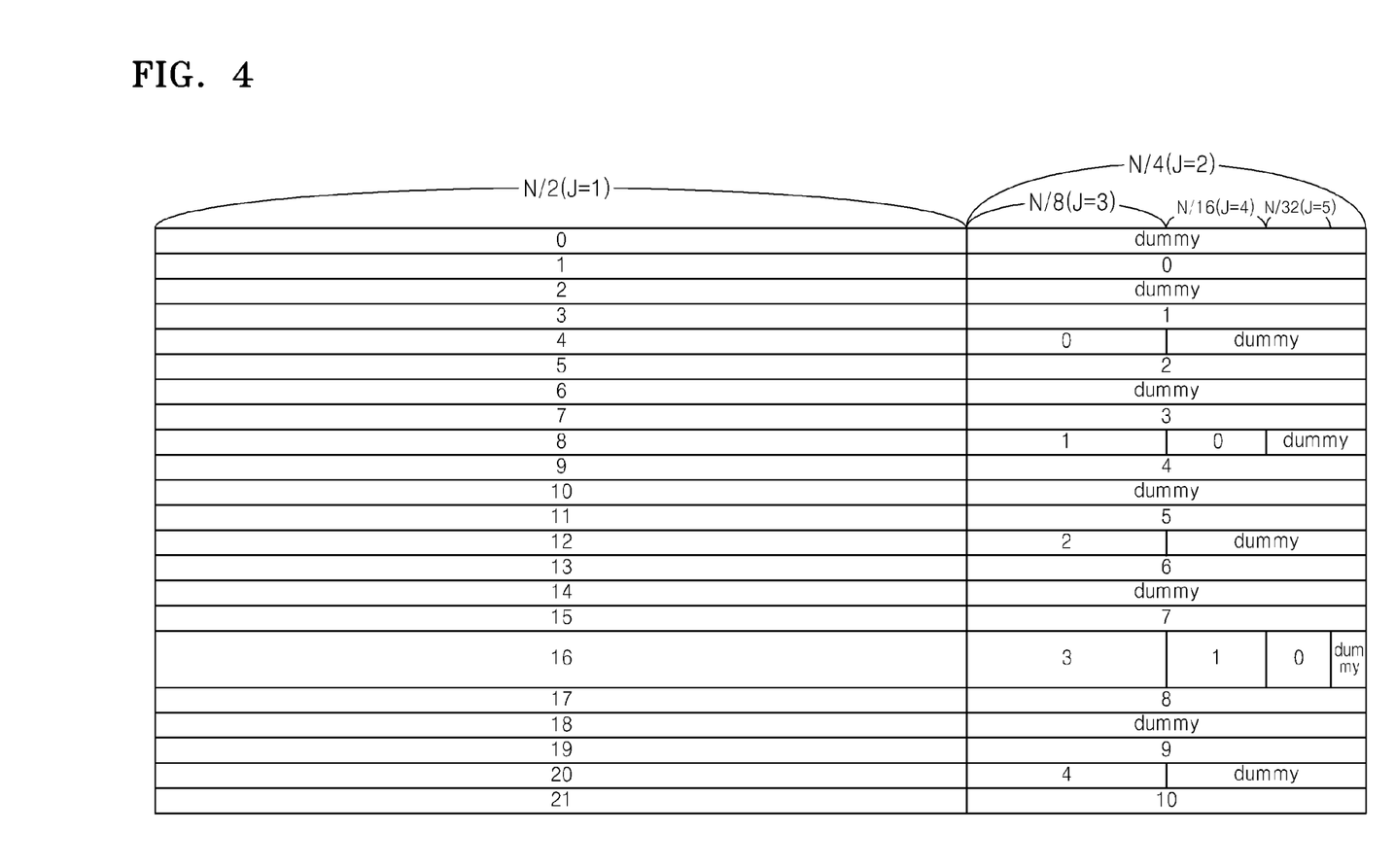
FIG. 4 is a view illustrating allocations to images of resolution levels performed by a direct memory access (DMA) controller according to an exemplary embodiment.

FIG. 4 is a view illustrating allocations to images of resolution levels performed by the DMA controller 111, according to an exemplary embodiment.

As shown in FIG. 4 and FIG. 2, the DMA controller 111 regularly stores multi-resolution images, which are generated according to their respective resolutions, in the multi-resolution memory 220. The motion vector detector 130 may read the images regularly stored in the multi-resolution memory 220 in the unit block according to their respective resolutions.

More specifically, the DMA controller 111 has a line jump function and regularly stores columns of resolution according to each block in the multi-resolution memory 220. Therefore, the motion vector detector 130 may easily read blocks according to each resolution. As shown in FIG. 4, the DMA controller 111 embeds columns, corresponding to resolution level higher than or equal to J>2, between columns corresponding to resolution level J=2 to have size of (N/2+N/4)×(N/2), in order to store images having all resolutions higher than or equal to J=1 in one frame.

The characteristic extractor 120 generates a characteristic dot pixel of an image having an intermediate resolution level from multi-resolution images generated by the parallel image generator 110. The characteristic dot extractor 120 generates a characteristic dot pixel from a sub-area of an image divided into square sub-areas, which do not overlap with one other, and extracts one characteristic dot of each of the sub areas so the characteristic extractor 120 generates K characteristic dots of K sub-areas. According to an exemplary embodiment, the characteristic dot extractor 120 extracts a characteristic dot of an image having an intermediate resolution level (level J/2), and not of an image having the $0^{th}$ resolution level, in order to reduce a size of a line memory of an internally used filter.

According to an exemplary embodiment, the characteristic dot extractor 120 extracts corner dots of image pixels of a sub area to detect characteristic dots and uses an image pixel of the sub area having the largest corner as a characteristic dot of the sub area. A corner detecting method, such as the Harris and Stephens corner detection algorithm, which has been widely used for detecting a corner, may be used as a method of calculating a corner degree as in Equation 2 below:

$$G(i, j) = |N(x, y)| - {}_kT_r^2 N(x, y) \qquad (2)$$

$$N(x, y) = \begin{bmatrix} I_x^2 & I_x I_y \\ I_y I_x & I_y^2 \end{bmatrix}$$

Figure 5A:
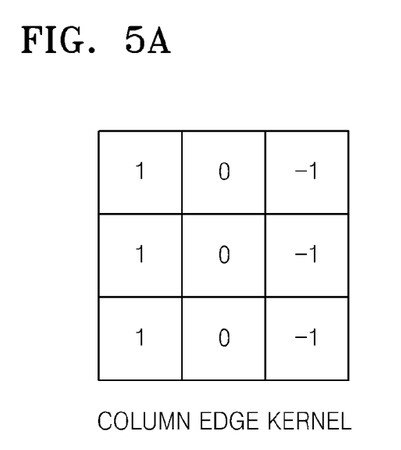
FIGS. 5A and 5B are views illustrating 3×3 filter kernels in column and row directions used for detecting a kernel to extract characteristic dots.
Figure 5B:
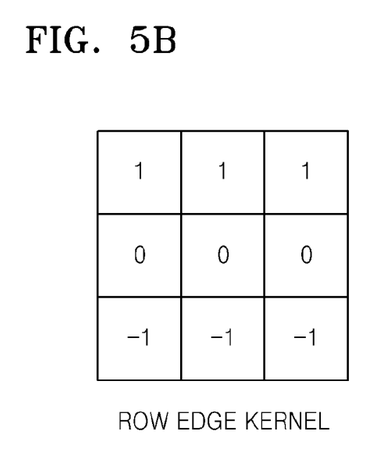

In Equation 2 above, N(x,y) denotes a structure matrix, Tr denotes a trace of a matrix, and Ix and Iy denote gradients of x and y axes, respectively, which are calculated by using a 3×3 filter kernel, as shown in FIGS. 5A and 5B.

FIGS. 5A and 5B illustrate 3×3 filter kernels of column and row directions used to detect corners.

Figure 6:
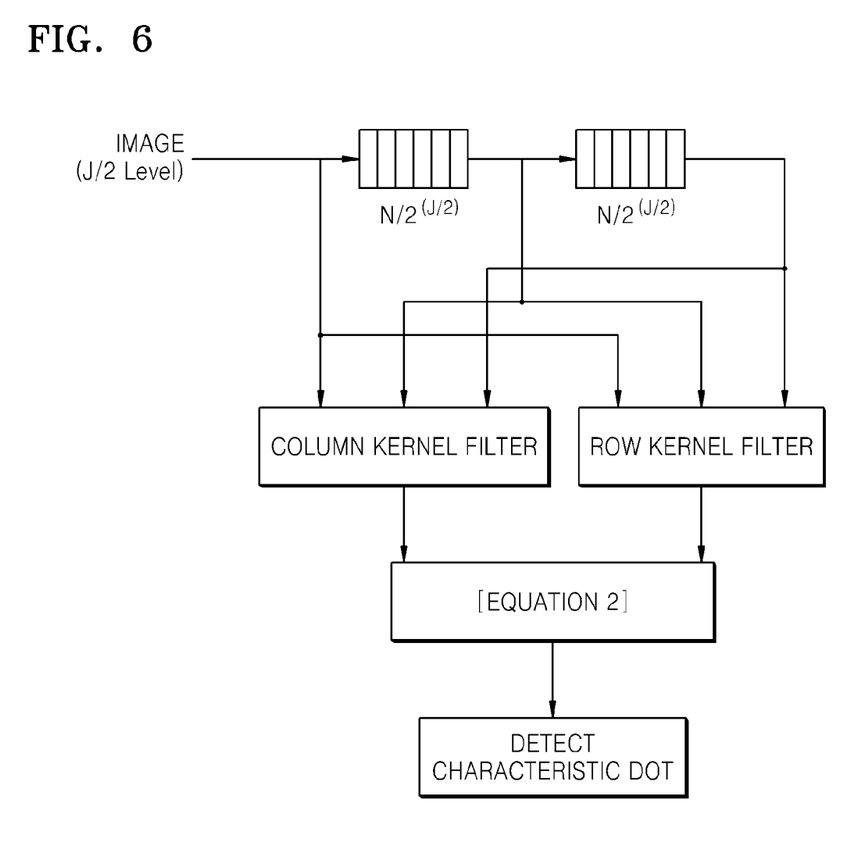
FIG. 6 is a view illustrating a process of extracting characteristic dots according to an exemplary embodiment.

FIG. 6 is a view illustrating a process of extracting characteristic dots according to an exemplary embodiment.

Referring to FIG. 6, if the original N×N image is processed, the column/row kernel filter of the characteristic extractor 120 has a line memory having a size of one column/row. If an image having a $J/2^{th}$ intermediate resolution level is processed, the column kernel filter requires line memories having size of $N/2^{(J/2)}$. If characteristic dots of sub areas of the image having the $J/2^{th}$ intermediate resolution level are detected, the characteristic extractor 120 maps a characteristic of the $J^{th}$ resolution level, which is the lowest resolution level, to each of the characteristic dots. The motion vector detector 130 extends the characteristic dots which is detected by the characteristic extractor 120 from low-resolution image to multi-resolution image based on mapped characteristic dots, and detects motion vectors according to the characteristic dots.

The motion vector detector 130 estimates a motion from a low-resolution image of previous and current multi-resolution frame images stored in the multi-resolution memory 220 based on mapped characteristic dots for the $J^{th}$ resolution level by using a block matching method, sequentially extends the low-resolution images to high-resolution images, and detects a motion vector of characteristic dots.

Figure 7:
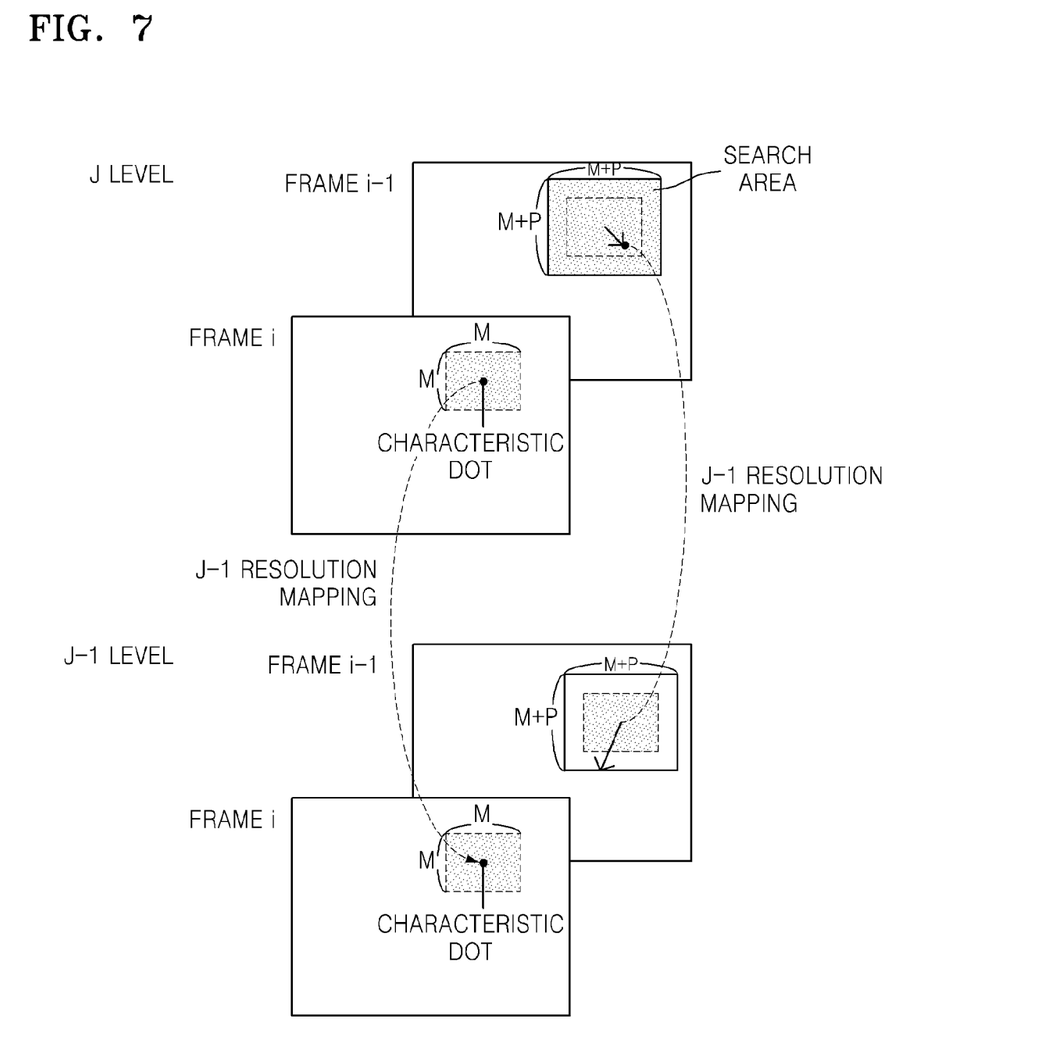
FIG. 7 is a view illustrating a process of detecting a motion vector from a low-resolution image according to an exemplary embodiment.

FIG. 7 is a view illustrating a process of detecting a motion vector from a low-resolution image according to an exemplary embodiment.

Referring to FIG. 7, the motion vector detector 130 sequentially extends an image having the $J^{th}$ resolution level, which is the lowest resolution image, one resolution level by one resolution level to detect a motion vector. The motion vector detector 130 extracts the motion vector from the image having the $J^{th}$ resolution level, extends the extracted motion vector to an image having the $J-1^{th}$ resolution level, and uses the extracted motion vector as an initial value when a motion is obtained from the image having the $J-1^{th}$ resolution level. According to this method, the motion vector detector 130 may extend images to an image having the $0^{th}$ resolution level to extract a motion vector. In other words, motion vector detector 130 uses the motion vector detected from the low-resolution image as an initial value when obtaining a motion vector from the high-resolution image.

In order to calculate a motion vector, a square motion estimation block M×M, based on one characteristic dot in a current frame image, is compared with a search area block (M+P)×(M+P), obtained by extending a motion estimation block by P in a previous frame image, i.e., block matching is performed, to calculate a coordinate of a block having a lowest difference between the square motion estimation block M×M and the search area block (M+P)×(M+P). A block matching method which uses a difference between two blocks to detect a motion vector, as described above, may use a mean absolute difference (MAD) method. The MAD method is based on an average of a sum of absolute values of differences of pixels of a block within the block.

As a search area increases, the size of computation blocks increase. Therefore, hardware requirements for block matching also increases. A relatively smaller number of motion vectors occur in the low-resolution image having the $J^{th}$ resolution level than in high-resolution images, and thus the low-resolution image may have a smaller motion search range. Images having resolution levels higher than the $J^{th}$ resolution level use the same search areas as the image having the $J^{th}$ resolution level. However, motion vectors detected in a low-resolution image are continuously cumulated, even in a high-resolution image. Therefore, the low-resolution image has an increased search area.

The processor 310 obtains a motion vector extracted by the motion vector detector 130 to obtain a global motion vector. More specifically, the processor 310 determines the global motion vector by using K motion vectors of the original image having the $0^{th}$ resolution level from which the K motion vectors extracted by the motion vector detector 130. The processor 310 may determine the whole area motion vector by using a histogram or an mean value among the extracted K motion vectors.

The sway corrector 320 corrects sways of an image, based on the whole area motion vector obtained by the processor 310. As described above, the sway corrector 320 may correct sways of an image in real time.

Figure 8:
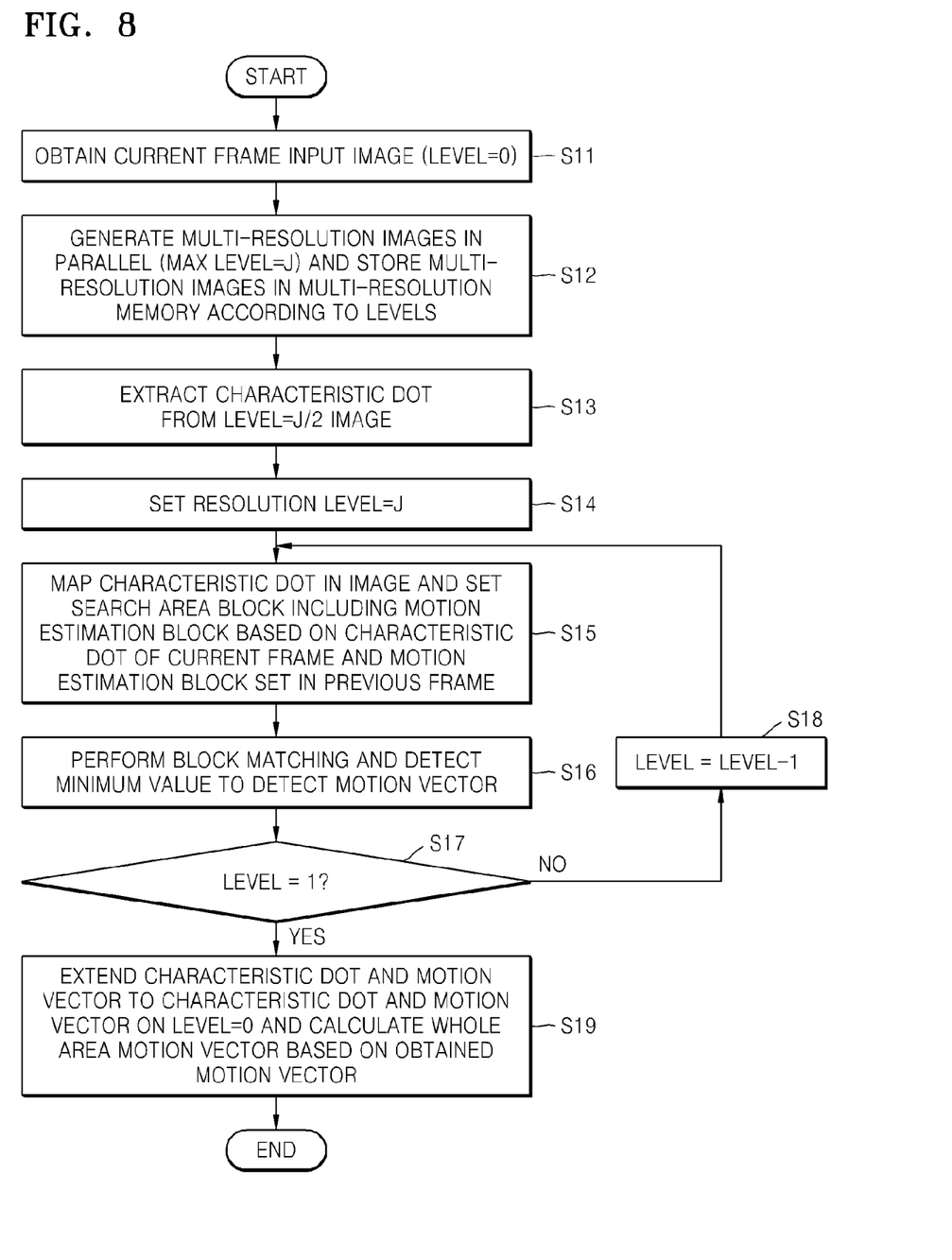
FIG. 8 is a flowchart illustrating a method of detecting a motion vector according to an exemplary embodiment.

FIG. 8 is a flowchart illustrating a method of detecting a motion vector according to an exemplary embodiment.

In operation S11, an original image of a current frame is input from the input image memory 210. As described above, the original image may be expressed as an image having the $0^{th}$ resolution level.

In operation S12, the parallel image generator 110 generates multi-resolution images in parallel and stores the multi-resolution images in the multi-resolution memory 220.

The characteristic dot extractor 120 extracts a characteristic dot from an image having the $J/2^{th}$ resolution level in operation S13 and sets a resolution level to J in operation S14.

The characteristic dot is mapped in the image having the $J^{th}$ resolution level, and a motion estimation block is set based on a characteristic dot of the current frame. In operation S15, a search area block including a motion estimation block is set in a previous frame.

In operations S16 through S18, block matching is performed, and a minimum value of deference between present frame and previous frame is detected to detect a motion vector, and this process is repeated to obtain an image having the first resolution level.

In operation S19, the characteristic dot and the motion vector are extended to a characteristic dot and a motion vector on the $0^{th}$ resolution level, and a global area motion vector is calculated based on the obtained motion vector.

As described above, according to one or more exemplary embodiments, multi-resolution images for performing block matching may be generated in parallel. Also, a motion vector of a low-resolution image may be extended to a high-resolution motion vector based on a characteristic dot. Therefore, a motion may be detected in real time.

One or more exemplary embodiments can also be embodied as a program command which may be executed through various computer components and recorded on a computer readable recording medium. The computer readable recording medium may include a program command, a data file, a data structure, or combinations thereof. The program command recorded on the computer readable recording medium may be particularly designed and constituted for one or more exemplary embodiments, or may be one that is well known to and used by those of ordinary skill in the computer software field. Examples of the computer readable recording medium include a magnetic medium, such as a hard disk, a floppy disk, or a magnetic tape, an optical recording medium, such as a CD-ROM or a DVD, a magneto-optical medium, such as an optical disk, and a hardware device which is particularly constituted to store and execute a program command such as a read-only memory (ROM), a random-access memory (RAM), a flash memory, or the like. Examples of the program command include a machine language code which is made by a compiler and a high-level language code which may be executed by a computer by using an interpreter or the like. The hardware device may be substituted with one or more software modules to execute processing according to the, and vice versa.

While this invention has been particularly shown and described with reference to exemplary embodiments thereof, it will be understood by those skilled in the art that various changes in form and details may be made therein without departing from the spirit and scope of the exemplary embodiments. The forgoing exemplary embodiments and advantages are merely exemplary and are not to be construed as limiting. Also, the description of the exemplary embodiments is intended to be illustrative, and not to limit the scope of the claims, and may alternative, modifications, and variations will be apparent to those skilled in the art.

What is claimed is:

1. A system for detecting a motion, comprising:
a parallel image generator configured to generate, in parallel, multi-resolution images, the generated multi-resolution images having at least two or more resolution levels;
a characteristic dot extractor configured to extract a characteristic dot from at least one of the generated multi-resolution images; and
a motion vector detector configured to detect a motion vector from a low-resolution image based on the extracted characteristic dot, and further configured to extend the detected motion vector of the low-resolution image to a high-resolution motion vector based on a result of the detection,
wherein the characteristic dot extractor is further configured to generate a characteristic dot pixel from an image of a generated multi-resolution image having an intermediate resolution level, and
wherein the characteristic dot extractor is further configured to divide at least one of the generated multi-resolution images into a plurality of square areas which do not overlap with each other, and configured to generate characteristic dot pixels of the square areas, the characteristic dot being determined based on the characteristic dot pixels.

2. The system of claim 1, wherein the parallel image generator is further configured to obtain an original image having a $0^{th}$ resolution level from an input image memory to generate, in parallel, the multi-resolution images.

3. The system of claim 2, wherein when the parallel image generator generates images having resolution levels from a first resolution level to a $j^{th}$ resolution level, the multi-resolution image of each resolution has size of $(N \times N)/4^J$ of the obtained original image.

4. The system of claim 3, wherein the parallel image generator is further configured to store the generated multi-resolution images in a multi-resolution memory through a direct memory access (DMA) controller.

5. The system of claim 4, wherein the DMA controller is configured to sequentially arrange the generated multi-resolution images based on resolution levels of the generated multi-resolution images, and is further configured to store the arranged multi-resolution images in the multi-resolution memory.

6. The system of claim 4, wherein the DMA controller is further configured to perform DMA transmission scheduling with respect to output results having at least a second resolution level on an odd line of the first resolution level to reduce a size of hardware.

7. The system of claim 4, wherein the DMA controller is further configured to store all of the multi-resolution images in the multi-resolution memory.

8. The system of claim 4, wherein the DMA controller is further configured to embed and store a generated multi-resolution image having a resolution higher than a second resolution level between columns storing an image having the second resolution level.

9. The system of claim 1, wherein the parallel image generator is further configured to generate an image having a first resolution level, and configured to simultaneously generate, in parallel, images having resolution levels higher than a second resolution level.

10. The system of claim 1, wherein the characteristic dot extractor is further configured to extract corner dots of pixels of the plurality of square areas, and configured to use a pixel having a greatest corner value as a characteristic dot of a sub area.

11. The system of claim 1, wherein the characteristic dot extractor is further configured to map the generated characteristic dot pixel of the image having the intermediate resolution level on an image having a lowest resolution level.

12. The system of claim 1, wherein the motion vector detector is further configured to map a motion from a low-resolution image using previous and current frame images of the low-resolution image, and configured to extend the estimated motion to a high-resolution image to detect a motion.

13. The system of claim 1, wherein the motion vector detector is further configured to use the motion vector detected from the low-resolution image as an initial value when obtaining a motion vector from the high-resolution image.

14. The system of claim 1, wherein the motion vector detector is further configured to set a motion estimation block based on one characteristic dot in a current frame image and a search area block, including the motion estimation block in a previous frame image, and configured to compare the motion estimation block with the search area block to detect a motion vector based on a result of the setting.

15. A method of detecting a motion, comprising:
generating, by a parallel image generator, in parallel, multi-resolution images, the generated multi-resolution images having two or more resolution levels;
extracting, by a characteristic dot extractor, a characteristic dot from an image of the generated multi-resolution images; and
detecting, by a motion vector detector, a motion vector from a low-resolution image based on the extracted characteristic dot and extending the detected motion vector of the low-resolution image to a high-resolution motion vector,
wherein the extracting comprises generating a characteristic dot pixel from an image of a generated multi-resolution image having an intermediate resolution level, and
wherein the extracting further comprises dividing at least one of the generated multi-resolution images into a plurality of square areas which do not overlap with each other, and generating characteristic dot pixels of the square areas, the characteristic dot being determined based on the characteristic dot pixels.

16. A system for detecting a motion, comprising:
a parallel image generator configured to generate, in parallel, multi-resolution images, the generated multi-resolution images having at least two or more resolution levels if lines for generating the images having the different resolution levels are valid;
a characteristic dot extractor configured to extract a characteristic dot from an image of multi-resolution images;
a motion vector detector configured to detect a motion vector from a low-resolution image based on the extracted characteristic dot, and further configured to extend the detected motion vector of the low-resolution image to a motion vector of a high-resolution image based on a result of the detection;
a direct memory access (DMA) controller configured to store the multi-resolution images generated by the parallel image generator in a multi-resolution memory according to resolution levels; and
a sway corrector configured to correct a sway of an image by using the motion vector of the high-resolution image,
wherein the characteristic dot extractor is further configured to generate a characteristic dot pixel from an image of a generated multi-resolution image having an intermediate resolution level, and
wherein the characteristic dot extractor is further configured to divide at least one of the generated multi-resolution images into a plurality of square areas which do not overlap with each other, and configured to generate characteristic dot pixels of the square areas, the characteristic dot being determined based on the characteristic dot pixels.

\* \* \* \* \*